UNITED STATES PATENT OFFICE.

SYLVESTER GILBERT, OF PORTSMOUTH, NEW HAMPSHIRE.

IMPROVEMENT IN MEDICAL COMPOUNDS OR LIVER LOZENGES.

Specification forming part of Letters Patent No. 145,498, dated December 16, 1873; application filed April 28, 1873.

*To all whom it may concern:*

Be it known that I, SYLVESTER GILBERT, of Portsmouth, in the county of Rockingham and State of New Hampshire, have invented a certain Compound called "Gilbert's Excelsior Liver Lozenges," to be used as a medicine for the cure of diseases, of which the following is a specification:

The nature of the invention of the said GILBERT consists in mixing leptandra Virginica and chelone glabra with sugar and mucilage, with or without flavoring matter to disguise the taste, as may be thought best.

To prepare the Gilbert Excelsior Liver Lozenge, take one pound of pulverized leptandra Virginica, one pound of chelone glabra, four pounds of pulverized white sugar, with mucilage enough to make the preparation of a proper consistency to work into lozenges. The proportion of flavoring is one-half ounce of oil of sassafras or other flavoring substance to the above preparation. Mix the same all thoroughly together, and work the preparation into lozenges.

I claim as my invention—

A compound medicine consisting of leptandra Virginica, in combination with chelone glabra, sugar, and mucilage, substantially as and for the purpose specified.

SYLVESTER GILBERT.

Witnesses:
SAMUEL DODGE,
JOHN D. MARSTON.